United States Patent
Walker et al.

(10) Patent No.: US 6,546,492 B1
(45) Date of Patent: Apr. 8, 2003

(54) SYSTEM FOR SECURE CONTROLLED ELECTRONIC MEMORY UPDATES VIA NETWORKS

(75) Inventors: Anthony Dean Walker, Rougemont, NC (US); John S. Petty, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/277,434

(22) Filed: Mar. 26, 1999

(51) Int. Cl.⁷ .................................................. G06F 1/24
(52) U.S. Cl. ........................................ 713/200; 713/201
(58) Field of Search ............................ 713/200, 201, 713/153, 168, 155, 176, 178

(56) References Cited

U.S. PATENT DOCUMENTS

| | | | | |
|---|---|---|---|---|
| 5,889,860 A | * | 3/1999 | Eller et al. | 705/26 |
| 6,154,543 A | * | 11/2000 | Baltzley | 380/255 |
| 6,332,025 B2 | * | 12/2001 | Takahashi et al. | 380/281 |
| 6,378,069 B1 | * | 4/2002 | Sandler et al. | 380/255 |

FOREIGN PATENT DOCUMENTS

EP 0809182 11/1997 ............ G06F/9/445

OTHER PUBLICATIONS

*Computer Networks*, Andrew S. Tanenbaum, Prentice–Hall, Inc., 1981, pp. 406–417.

"FAQ Questions 2.1.1, 3.6.1, and 2.1.3", http://www.rsa.com/rsalabs/, Copyright 1998 RSA Data Security, Inc.

"Encryption Choices Beyond DES", www.edsmag.com. Nov. 1998.

"Secure Wireless Messaging: A New Approach to Digital Certificates", *Wireless Design & Development*.

"Elliptic Curves Increase Security", *Electronic Engineering Times*, Dec. 27, 1998.

* cited by examiner

*Primary Examiner*—Ly V. Hua
(74) *Attorney, Agent, or Firm*—Woods, Phillips, VanSanten, Clark & Mortimer (57) ABSTRACT

A system and method for updating software for a remote unit over a network is disclosed herein. The system and method includes the remote unit, an authentication server and an update server. The remote unit may have a flasher host for communicating over the network and for transmitting commands to the remote unit. The system and method allows for the verification of a request message from the remote unit, and a response from the authentication server. The response message to the remote unit from the authentication server will contain an decryption key to decrypt the update file that will be sent by the update server. Such an authentication process prevents rogue programs from being sent to the remote unit thereby decreasing the potential for cellular fraud.

18 Claims, 7 Drawing Sheets

SYSTEM FOR SECURE CONTROLLED ELECTRONIC MEMORY UPDATES VIA NETWORKS

FIELD OF THE INVENTION

The present invention relates to a system for updating electronic memory over a network. More specifically, the present invention relates to a system for updating the electronic memory of a mobile unit using a secured procedure thereby preventing tampering with sensitive information.

BACKGROUND OF THE INVENTION

A remote or mobile unit may need to have its software/firmware updated because of defects in the software or the addition of new features for the software/firmware. Such remote units may be cellular telephones, PC cards, and the like. These remote units may have various computer programs that enable the remote unit to function properly. Current solutions to updating remote units force the user of the remote unit to choose between physically transporting the remote unit to a service center, or updating the system over a network without proper security features to prohibit tampering with sensitive information that may be contained in the remote unit or from the provider of the update program.

Further, due to governmental regulations to combat cellular telephone fraud, the owner or user of the remote unit may only have one choice to update the program of the remote unit, that being to physically transport the remote unit to a service center for updating of the computer program. The choice of updating the computer program over a network in an unsecured procedure would be prohibited by governmental regulations in order to prevent cellular telephone fraud.

In current network updating procedures, a remote unit will be connected to a network such as the Internet, and access a server that contains the new update program. The server will transfer the new update program to the remote unit, and the program will be implemented into the remote unit. A problem occurs when the remote unit has been cloned thereby allowing the cloned cellular telephone or other remote unit to have access to the new updated program furthering the cellular telephone fraud. Cellular telephones or other remote units are cloned by getting access to their computer programs. The perpetrators of the fraud acquire valid mobile identification numbers (MIN) and valid electronic serial numbers (ESN) through interception of these numbers over the cellular air waves. These valid MIN/ESN pairs are used to reprogram a remote unit such as a cellular telephone. It is such fraud that current government regulations seek to prevent by requiring programming and reprogramming of remote units such as cellular telephones at an authorized service center, thereby necessitating the physical transport of the remote unit to such service center.

Thus, in order to provide an owner or user of a remote unit with facilitated updating of the computer program of the remote unit, a secured system must be provided to enable an owner or user of a remote unit to update their program of the remote unit over a network such as the Internet.

SUMMARY OF THE INVENTION

The present invention provides a system for secured controlled updates of a remote unit software/firmware over a network. The present invention is able to accomplish this by providing an authentication protocol that verifies a valid remote unit and a valid update program.

One aspect of the present invention is a system for updating software programs of remote units in a controlled secure manner over a network. The system includes a remote programmable unit, an authentication server and an update server. The remote programmable unit has multiple software programs and a memory for storing programs, and it is adapted for connection to the network. The authentication server is disposed at a fixed site and accessible over the network. The authentication server verifies the authenticity of the remote programmable unit and provides an encryption key image to the remote programmable unit over the network. The update server is disposed at a fixed site and accessible over the network. The update server provides an encrypted update file program to the remote programmable unit over the network. The remote programmable unit decrypts the encrypted update file program with the encryption key image from the authentication server to update one of its software programs.

The remote unit may be a PC card or a cellular telephone. The system may also include a flasher host to provide connection to the network for the remote programmable unit. The authentication server may be integrated with the update server. The network may be the Internet, or an intracompany network. The remote programmable unit may be able to communicate with the flasher host over a cellular network.

Another aspect of the present invention is a method for updating software programs for remote units over a network in a secure controlled manner. The first step of the method is transmitting a request for a software update for a remote unit over a network. The next step is verifying the authenticity of a communication from an authentication server to the remote unit. The communication contains an encryption key to decode the update program for the software. The next step is transmitting the software program update from an update server to the remote unit. The next step is decrypting the update program with the encryption key. The final step is updating the software of the remote unit.

The authenticity of the communication may be verified by communicating a first random number from the authentication server to the remote unit, communicating a second random number from the remote unit to the authentication server, and then communicating a challenge response, based on the first and second random numbers, from the authentication server to the remote unit.

Another aspect of the present invention is a system for updating software programs via a network. The system includes a PC card, functions for transferring communications to the PC card over the network, functions for providing an encrypted update file program to the PC card, and functions for decrypting the update file program. The PC card has multiple software programs and a memory for storing software programs. The PC card is adapted for connection to the network. The encrypted update file program allows the PC card to update a particular software program after the update file program is decrypted by the PC card. The decrypting key is provided to the PC card from a remote server via the network.

BRIEF DESCRIPTION OF THE DRAWINGS

There is illustrated in FIG. 1 a schematic diagram of the system of the present invention.

There is illustrated in FIG. 2 a flow diagram of the authentication process for the system of the present invention.

There is illustrated in FIG. 3 a flow diagram of an update process for the system of the present invention.

There is illustrated in FIG. 4 a flow diagram of an alternative authentication process for the system of the present invention.

There is illustrated in FIG. 5 a flow diagram of yet another alternative authentication process for the system of the present invention.

There is illustrated in FIG. 6 a flow diagram of an alternative update process for the system of the present invention.

There is illustrated in FIG. 7 a flow diagram of yet another alternative update process for the system of the present invention.

DETAILED DESCRIPTION OF THE INVENTION

Figure 1:
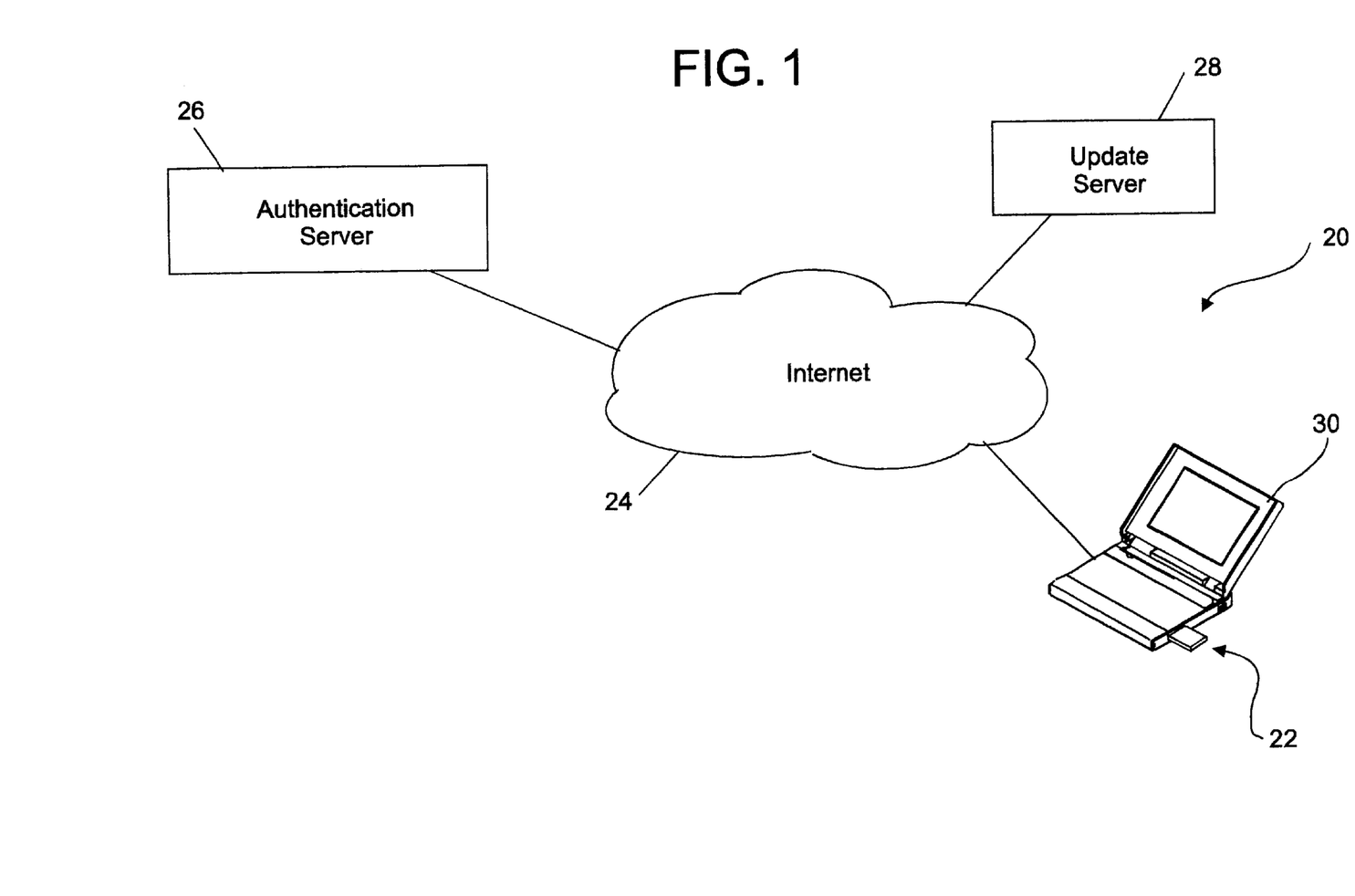

As shown in FIG. 1, an updating system of the present invention is generally designated 20. The system 20 includes a remote unit 22, a network 24, an authentication server 26, and an update server 28. The remote unit 22 may be a PC card such as a PCMCIA card, a cellular telephone, and the like. If the remote unit 22 is a PC card, it may preferably be a PC card with cellular telephone capacity. The remote unit 22 may be a stand alone unit, or it may be integrated with a flasher host PC 30, such as a laptop computer. The remote unit 22 in the form of a PC card plugs into a PC card slot of the flasher host 30, or in another form connects to the flasher host 30 via a conventional serial link. Alternatively, the necessary software programs of the flasher host 30 may be a component of a PC card or a cellular telephone. The functions of the flasher host 30 as they relate to the remote unit 22 are described below. A preferred network 24 is the Internet.

The basic characteristics of the remote unit 22 are that it must be capable of connecting to the network 24, and it must contain sufficient memory to receive and store the entire update file from the update server 28 before applying the update to its software. The remote unit 22 will accept the update command and use a previously stored key to decrypt the update program file. The remote unit 22 will use specific algorithms for decrypting the file. In order to accomplish this, the remote unit 22 should have an unerasable flash boot sector that will contain the necessary software to execute the update program thereby ensuring that the remote unit 22 is cable of accepting a flash update even if previous attempts to accept the update have failed or been aborted. The remote unit 22 has the capability of issuing commands to the authentication server 26, decoding responses from the authentication server 26, and storing encryption keys in a non-volatile memory.

The flasher host 30 manages the network connection and stores the update file prior to transferring the update program to the remote unit 22. The connection to the network from the flasher host 30 may be wired (land telephone) or wireless (cellular telephone). If the flasher host 30 is utilized as a network connection for the remote unit 22, the flasher host 30 will communicate with the authentication server 26 and the update server 28 over the network 24. The flasher host 30 will also issue appropriate commands to the remote unit 22, and transfer the update program to the remote unit 22. However, all of the functions of the flasher host 30 may be fully integrated on a single component remote unit 22 such as a cellular telephone, or a PC card with cellular telephone capabilities.

The authentication server 26 is responsible for verifying the authenticity of the update request from the remote unit 22, and also provides means for verification of the update program from the update server 28 by the remote unit 22. This verification means may be a symmetric or a non-symmetric encrypted image key depending on the update process utilized, and the capabilities of the remote unit 22 and the authentication server 26 as further described below. A non-symmetric key may only be used to decrypt a program file, and may not be used to encrypt such program file. A symmetric key may be used to encrypt a program file as well as decrypt the program file.

The update server 28 is responsible for providing the update program to the remote unit 22 via the network 24. In one embodiment, the update server 28 is paired with the authentication server 26 thereby combining the functions of the authentication server 26 and the update server 28 into a single server as further described below.

Figure 2:
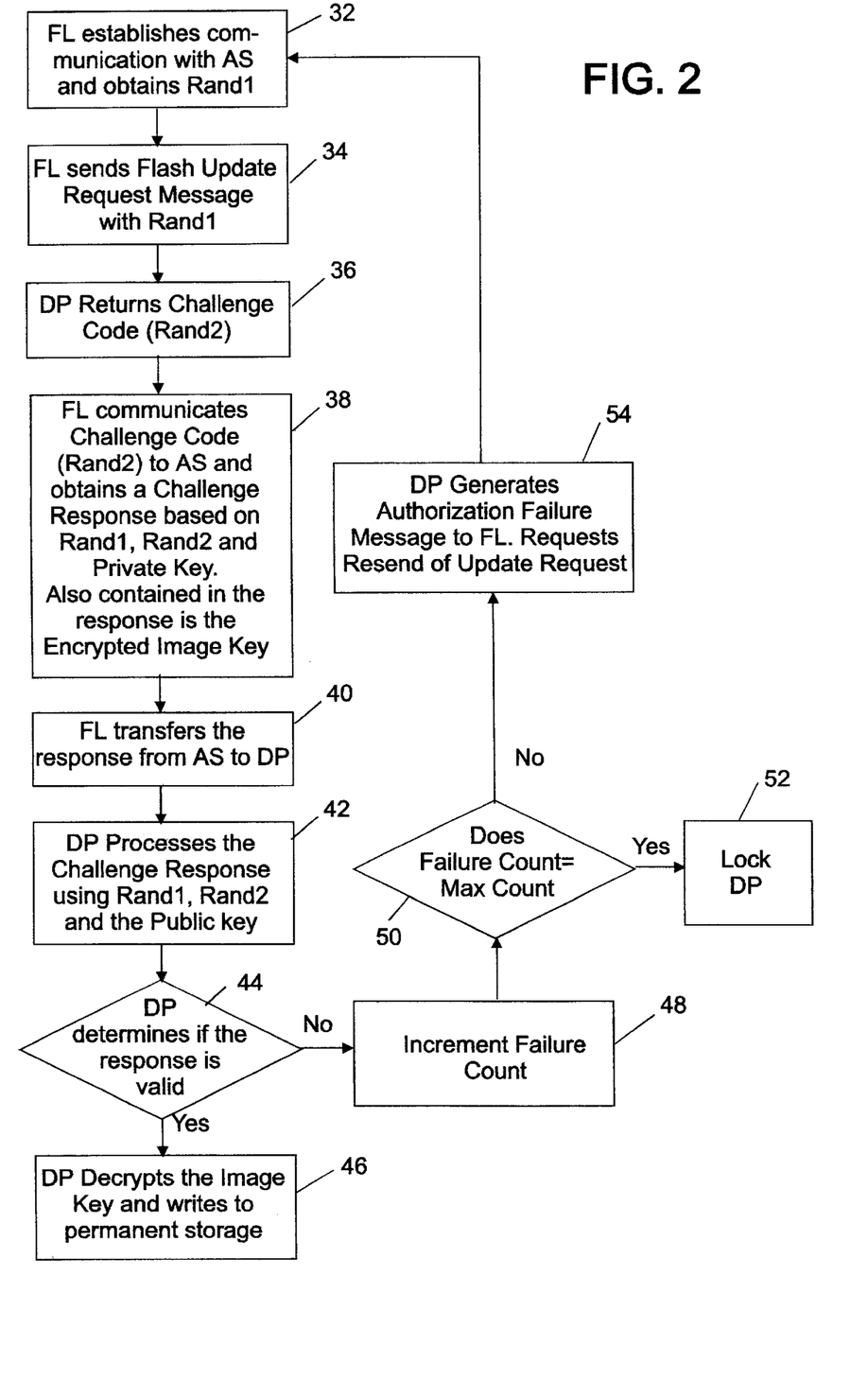

An authentication process for the system 20 is illustrated in FIG. 2. At block 32, communication is established between the authentication server 26 and the flasher host 30 via the network 24. For clarity, the authentication process will be described with a PC card 22a as the remote unit 22 which is connected to the flasher host 30. The authentication server 26 provides a random number to the flasher host 30. At step 34, the flasher host 30 communicates the first random number from the authentication server to the PC card 22a within a flash update request command. At step 36 the PC card 22a communicates a challenge code in the form of a second random number to the flasher host 30. At step 38 the flasher host 30 communicates the second random number to the authentication server 26.

The authentication server 26 communicates a challenge response to the flasher host 30. The challenge response is based on the first random number, the second random number and a private key known only by the authentication server 26. The challenge response is encrypted and also contains an encrypted image key that will be used by the PC card 22a to decode the encrypted update file program from the update server 28. At step 40 the flasher host 30 transfers the response from the authentication server 26 to the PC card 22a. At step 42 the PC card 22a processes the challenge response using a public key known by the PC card 22a to verify the authenticity of the challenge response from the authentication server 26 based on the first random number, the second random number, and the private encryption key. At step 44 the PC card 22a determines if the challenge response is valid or not. The verification of the challenge response allows for the prevention of rogue programs from being introduced into the PC card 22a. If the challenge response is valid, at step 46, the PC card 22a decrypts the image key and writes it to permanent storage on the PC card 22a.

However, if the challenge response is not valid, then at step 48 a failure code is generated by the PC card 22a. At step 50 an inquiry is made as to the number of failure codes to determine if a maximum failure count has been reached by the PC card 22a. If the maximum failure count has been reached, then at step 52 the PC card 22a locks itself to prevent further tampering. However, if the maximum failure count has not been reached, at step 54 the PC card 22a generates an authorization failure message to the flasher host 30 and requests that the authentication server 26 resend the update request. Then, the process is repeated to transmit a valid encryption image key to the PC card 22a.

Figure 3:
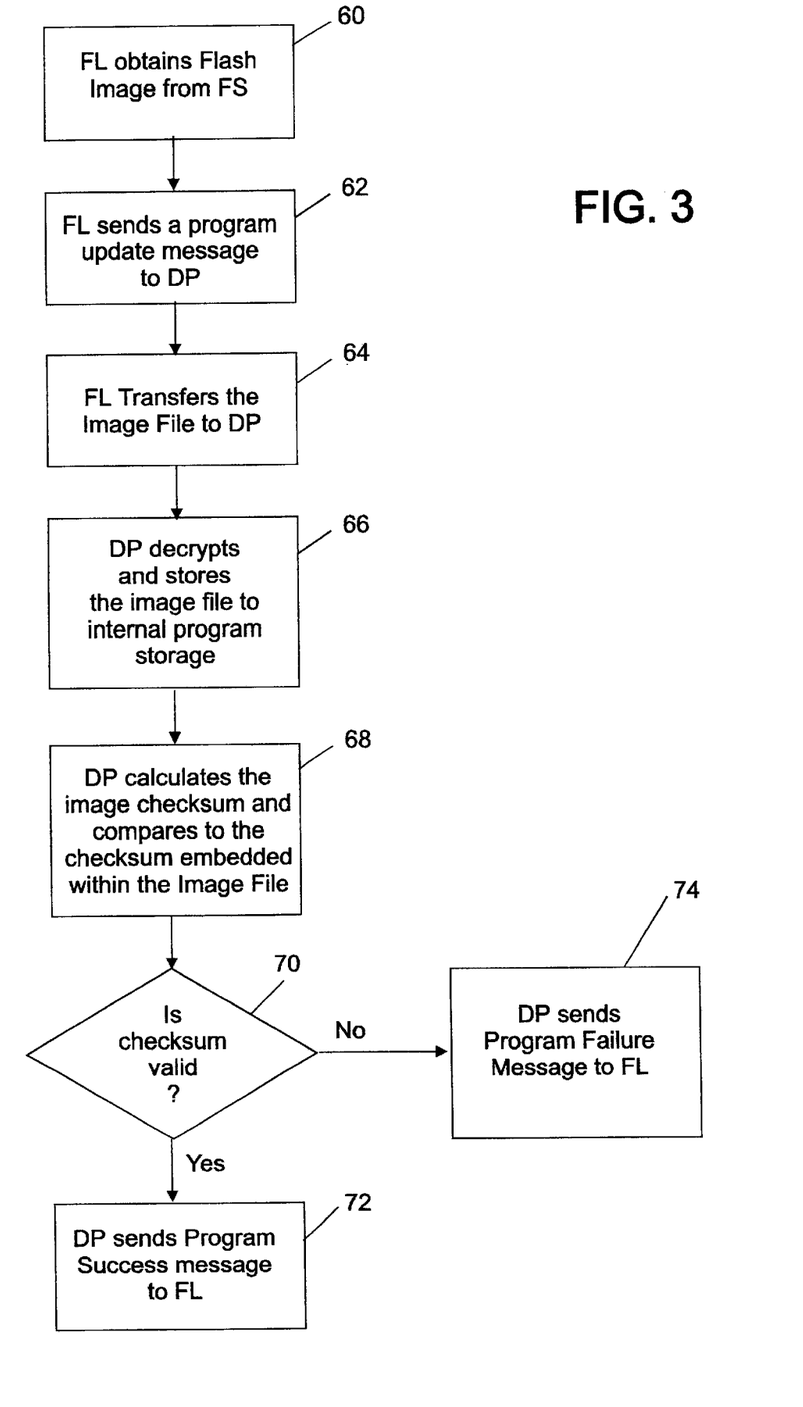

An update process for the system 20 of the present invention is illustrated in FIG. 3. After the authentication process of FIG. 2, and the PC card 22a has obtained a valid encrypted image key, the PC card 22*a* receives the update file program from the update server 28. At step 60, the flasher host 30 obtains the update file program from the update server 28. At step 62, the flasher host 30 sends the update file program to the. PC card 22*a*. At step 66 the PC card 22*a* accepts the encrypted update file program from the flasher host 30. As the program is received, the PC card 22*a* decrypts the update file program and writes the program to its internal storage. At step 68, the PC card 22*a* calculates a check sum for the update file program and compares the check sum contained within the decrypted update file program.

The check sum may be a one-way hash function which is a function that is simple to compute in a forward direction, but difficult to compute in a reverse direction thereby preventing rogue programs from being introduced into the PC card 22*a*. A one-way hash function, H(M), operates on an arbitrary-length input, M, which may be composed of selected electronic memory contents. The hash function performed on M returns a fixed-length hash value, h, where an h equals H(M). The main characteristics of a one-way hash function are that given M, it is easy to compute h, however, given h it is difficult to compute M.

Returning to FIG. 3, at step 70 the check sum is verified to determine if it is valid or not. If the check sum is valid, then at step 72 the PC card 22*a* sends a success message to the flasher host 30 and activates the new program to update its software. However, if the check sum is invalid, at step 74 the PC card 22*a* sends a program failure message to the flasher host 30 thereby terminating the update process. A perpetrator of fraud may attempt to access the program of the PC card 22*a*, or some other remote unit 22 such as a cellular telephone to perform cloning operations. Such operations and possible counter-measures are described in co-pending U.S. patent application Ser. No. 08/706,574, filed on Sep. 5, 1996, entitled System For Preventing Electronic Memory Tampering, and which relevant parts are hereby incorporated by reference.

Figure 4:
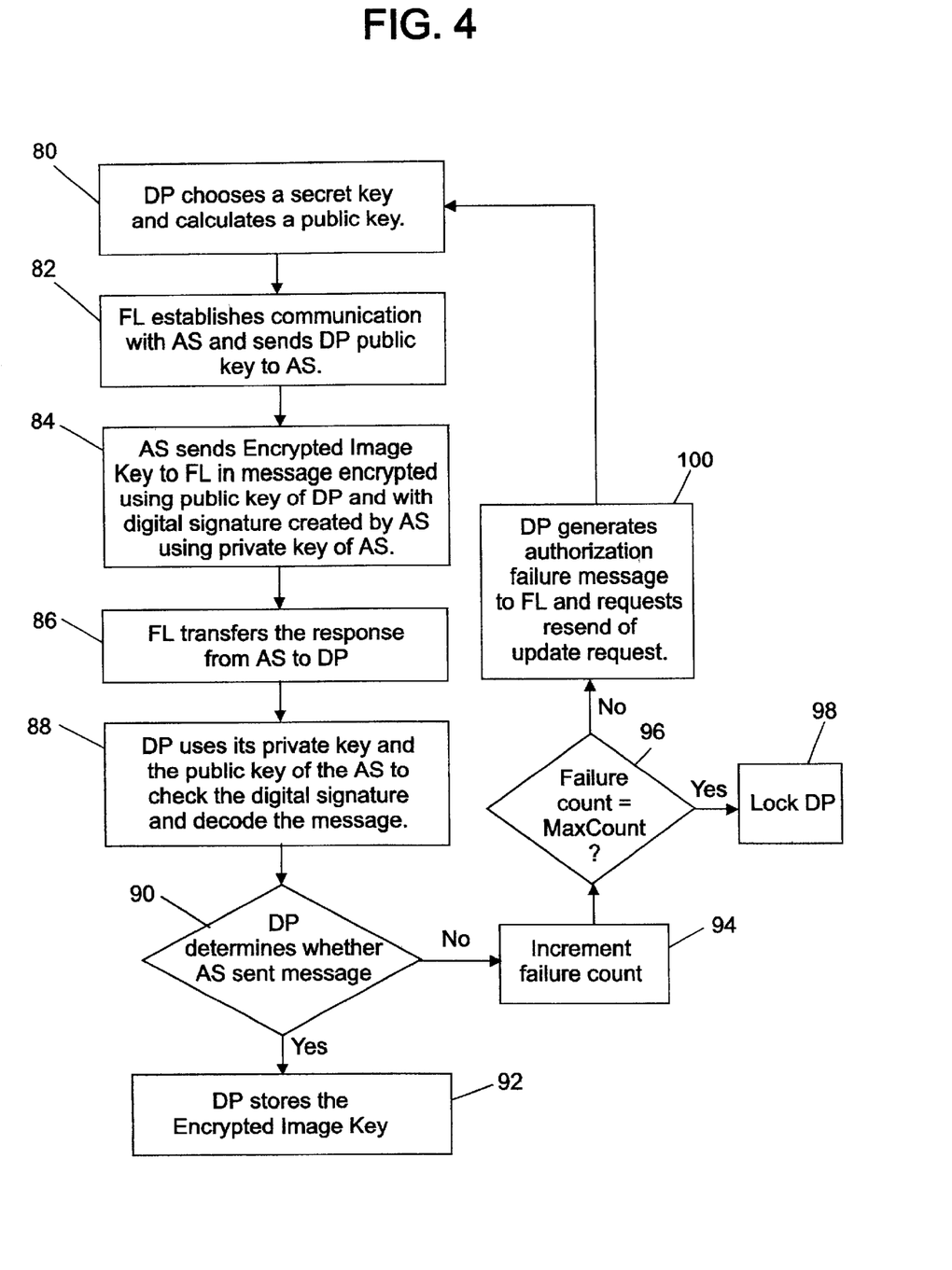

An alternative authentication process for the system 20 of the present invention is illustrated in FIG. 4. The authentication process of FIG. 4 requires fewer communication exchanges than the authentication process of FIG. 2, however it is functionally equivalent in that the remote unit 22 authenticates the authentication server 26 and thus will accept the software file decode key only if that key is transmitted from the authentication server 26. The authentication process of FIG. 4 may used in conjunction with the update process of FIG. 3. As with the authentication process of FIG. 2, a PC card 22*a* will be used as the remote unit 22 for the authentication process of FIG. 4.

As shown in FIG. 4, at step 80 a PC card 22*a* chooses a private key and calculates a public key. At step 82, the flasher host 30 establishes communication with the authentication server 26, and sends the public key chosen from the PC card 22*a* to the authentication server 26. At step 84, the authentication server 26 sends the encrypted image key to the flasher host 30 in a message encrypted using the public key of the PC card 22*a* with a digital signature created by the authentication server 26 using a private key of the authentication server 26. At step 86, the flasher host 30 transfers the response from the authentication server 26 to the PC card 22*a*. At step 88, the PC card 22*a* uses its private key and the public key of the authentication server 26 to verify the digital signature in a conventional manner. The PC card 22*a* also decodes the message from the authentication server 26 using its public key and private key in a conventional manner. At step 90, the PC card 22*a* determines, in a conventional manner, whether the authentication server 26 sent the message, or if a rogue message has been sent to the flasher host 30.

If the PC card 22*a* determines that the authentication server 26 did in fact send the encrypted message, then the PC card 22*a* stores the encrypted image key from the authentication server 26. However, if it is determined that the response was not sent from the authentication server 26, then at step 94, a failure count is generated by the PC card 22*a*. At step 96, an inquiry is made as to the number of failure counts generated by the PC card 22*a*. If the maximum count is reached, then at step 98 the PC card 22*a* locks itself to prevent further tampering with its program. However, if the maximum count has not been reached, then the PC card 22*a* generates an authorization failure message to the flasher host 30 and requests that the authentication server 26 resend the update request.

Figure 5:
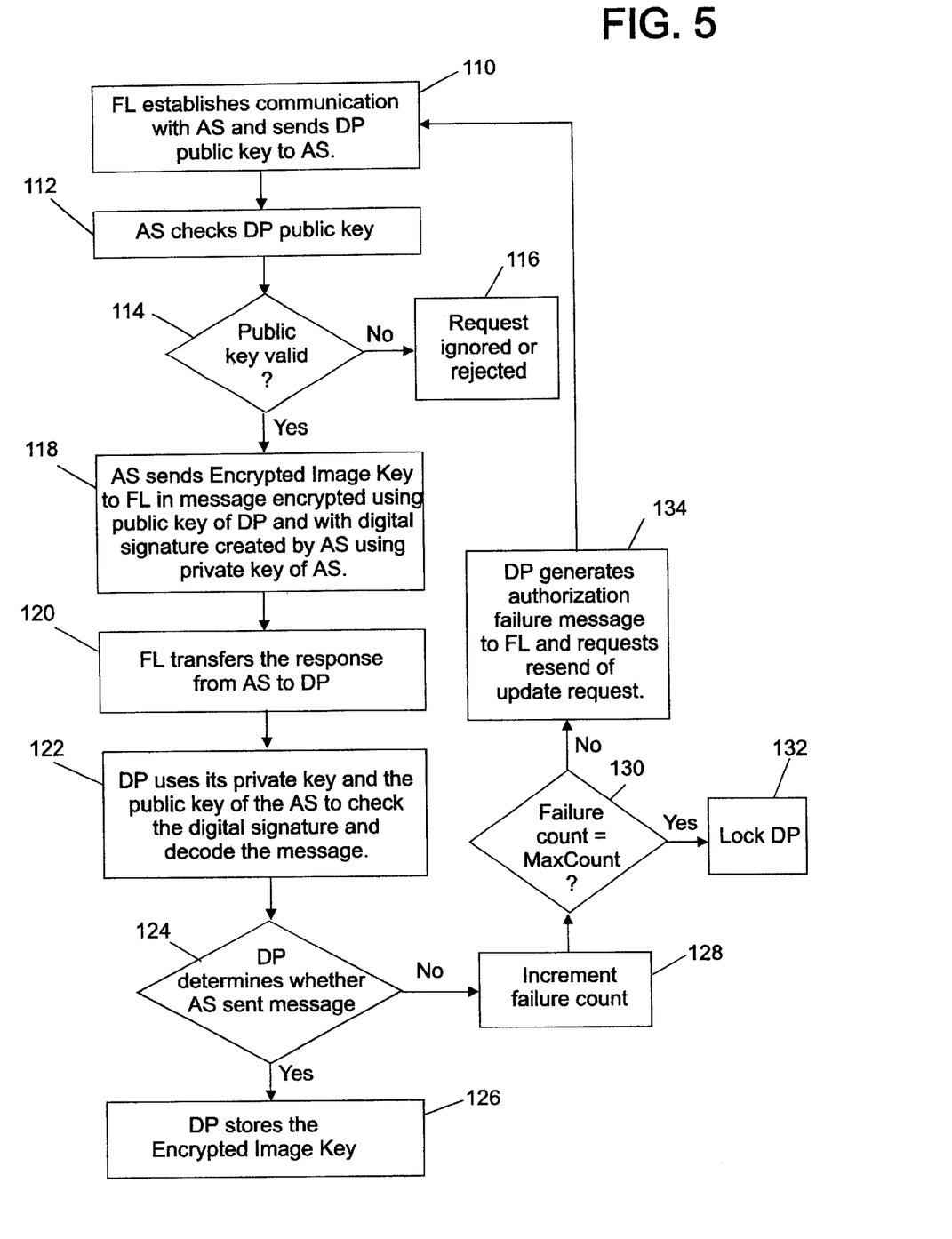

Yet another authentication process for the system 20 of the present invention is illustrated in FIG. 5. The authentication process of FIG. 5 requires that the remote unit 22 has integrated into its software the necessary public and private keys for use of an encryption key image from the authentication server 26. The authentication server 26 has a database of all of the legitimate mobile unit public keys. This allows the authentication server 26 to transmit the encrypted image key only to legitimate remote units 22. The size of the database maintained in the authentication server depends on the number of remote units 22 and the security of the private key contained within the remote units 22. If the private key is very secure, than all remote units 22 have the same public/private key pair. The other extreme would be for each remote unit 22 to have a distinct key pair. The use of distinct key pairs for each remote unit 22 allows the authentication server 26 to be more intelligent, aware of the update status of each remote unit 22, and reject unnecessary or unpaid for update file requests.

As shown in FIG. 5, at step 110 the flasher host 30 establishes communication with the authentication server 26 and transmits a public key generated by the PC card 22*a*. At step 112, the authentication server 26 verifies the authenticity of the public key transmitted from the flasher host 30. At step 114, an inquiry is made as to the validity of the public key. If the public key is invalid, thus indicating a request from a rogue remote unit 22, then at step 116 the request is ignored. An invalid public key is a key that has not been established for the remote unit 22 by the operator of the authentication sever 26, and is not contained on the list of valid public keys.

However, if the public key is valid (if it is on the list of approved public keys), then at step 118 the authentication server 26 transmits an encrypted image key to the flasher host 30 in a message encrypted using the public key of the PC card 22*a* with a digital signature created by the authentication server 26 using a private key of the authentication server 26. Using such a procedure, the encrypted image key can be a symmetric key since the key is not vulnerable to interception by a rogue remote unit 22. The authentication server 26 maintains a database of public keys of all remote units 22 thereby allowing for verification of legitimate remote units 22. Thus, even if someone intercepts a legitimate public key and uses it in a fraudulent request for the encrypted image key, the rogue mobile unit will not be able to decode the message containing the encrypted image key because a legitimate private key is needed to decode such a message.

At step 120, the flasher host 30 transfers the response from the authentication server 26 to the PC card 22*a*. At step 122, the PC card 22a uses its private key and the public key of the authentication server 26 to verify the digital signature and decrypt the message. At step 124, the PC card 22a determines whether the message was sent from the authentication server 26, or if the message is a rogue message that should be ignored. If the message is verified as being sent from the authentication server 26, then the PC card 22a stores the encrypted image key. However, if it is determined that the message was not sent by the authentication server 26, then at step 128 a failure count is generated by the PC card 22a. At step 130, an inquiry is made to the number of failure counts generated by the PC card 22a. If the maximum failure count has been reached, then at step 132 the PC card 22a locks itself to prevent further tampering. However, if the maximum failure count has not been reached, then at step 134, the PC card 22a generates an authorization failure message to the flasher host 30 and requests that the authentication server 26 re-transmit the update request.

Figure 6:
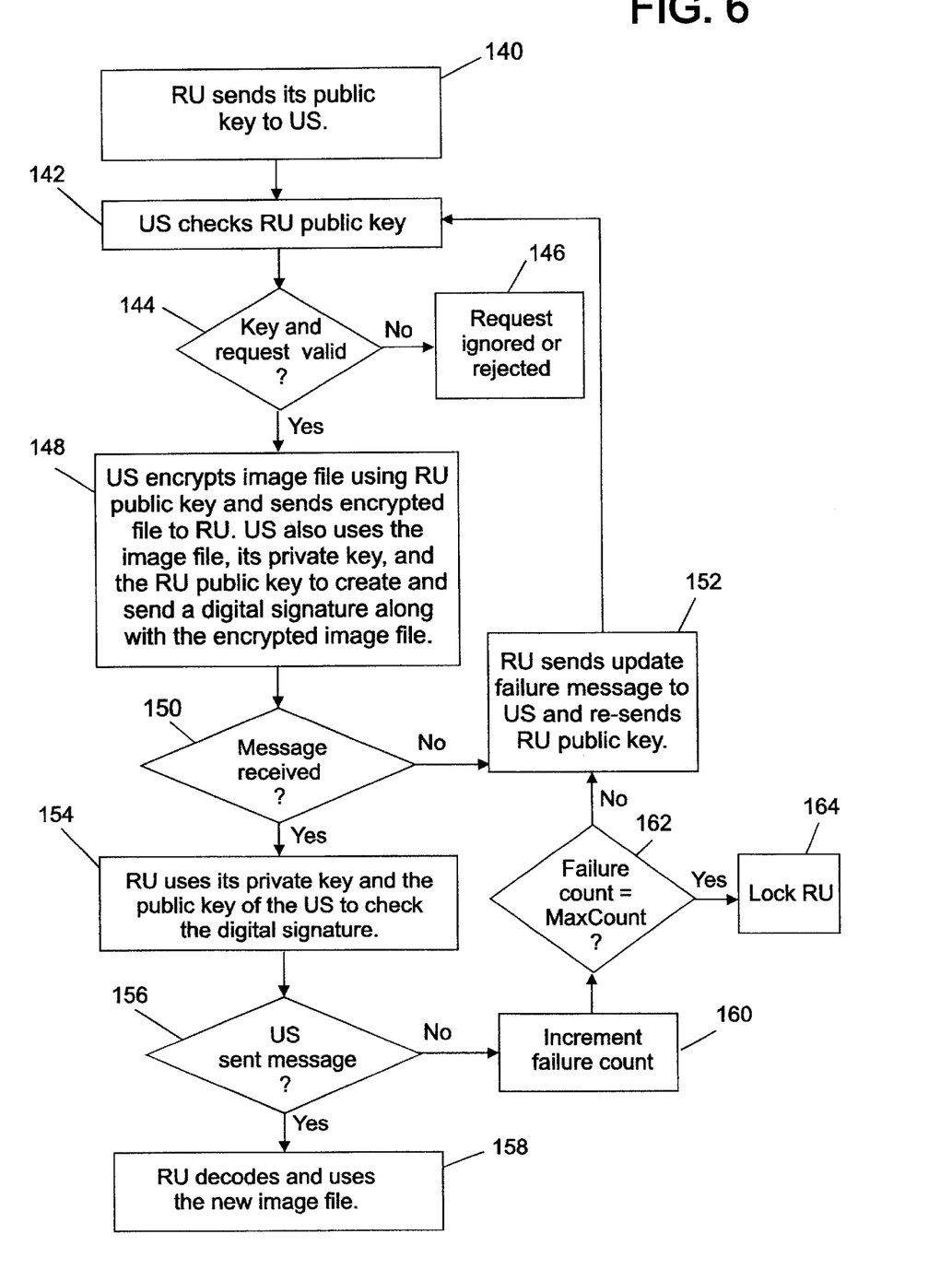

It is possible using the system 20 of the present invention to combine the authentication software program of the authentication server 26 with the update server 28 into a single server unit. This update server 28 with authentication capability is utilized if the security and processing power of the image server are sufficient, or if every remote unit 22 has the same public and private key pair. An authentication and update process for the system 20 of the present invention is illustrated in FIG. 6. The process of FIG. 6 utilizes the update server 28 with authentication capability. At step 140, the remote unit 22 transmits its public key to the update server 28. At step 142, the update server 28 verifies, in a conventional manner, that the public key of the remote unit 22 is contained on the approved list of public keys. At step 144, an inquiry is made as to the validity of the public key of the remote unit 22. If the public key is not contained in the database of the update server 28, and thus is not valid, then at step 146 the request is ignored. However, if the request and the key are valid, then at step 148 the update server 28 encrypts an update file program using the public key of the remote unit 22 and transmits that encrypted update file program to the remote unit 22.

The update server 28 also uses the update file program, its private key, and the public key of the remote unit 22 to create and send a digital signature along with the encrypted update file program. At step 150, an inquiry is made as to whether the message to has been received by the remote unit 22. If the message is not received, then the remote unit 22 sends an update failure message to the update server 28. However, if the message is received, then at step 154 the remote unit 22 uses its private key and the public key of the update server 28 to verify the digital signature sent by the update server 28. At step 156, an inquiry is made as to the source of the message. If it is verified that the message was sent by the update server 28, then the remote unit 22 decodes and implements the update file program thereby updating the software of the remote unit 22.

However, if the message was not sent by the update server 28, then at step 160, a failure message is generated by the remote unit 22. At step 162, an inquiry is made as to whether or not the maximum failure count has been reached by the remote unit 22. If the maximum failure count has been reached, then at step 164, the remote unit 22 locks itself thereby preventing tampering from any rogue programs. However, if the maximum failure count has not been reached, then at step 152 the remote unit 22 sends an update failure message to the update server 28 and retransmits its public key to the update server 28.

If all of the remote units 22 contain the same public/private key pair, the update server 28 will contain the update file program in an encrypted form. The update file program will be encrypted using the public key of the remote unit 22. Under such a scenario, the initial message from the remote unit 22 to the update server 28 will not contain the public key of the remote unit 22, however, the message will contain the current software/firmware level of the remote unit 22 to prevent unnecessary reloads of identical software/firmware. If the existing software/firmware level of a remote unit 22 is used to determine which exact software/firmware level to transmit to the remote unit 22, then the request message from the remote unit 22 to the update server 28 includes a digital signature that is constructed from the message, the public key of the update server 28 and the private key of the remote unit 22. Such a digital signature allows the update server 28 to verify that the request was transmitted from a legitimate remote unit 22.

Figure 7:
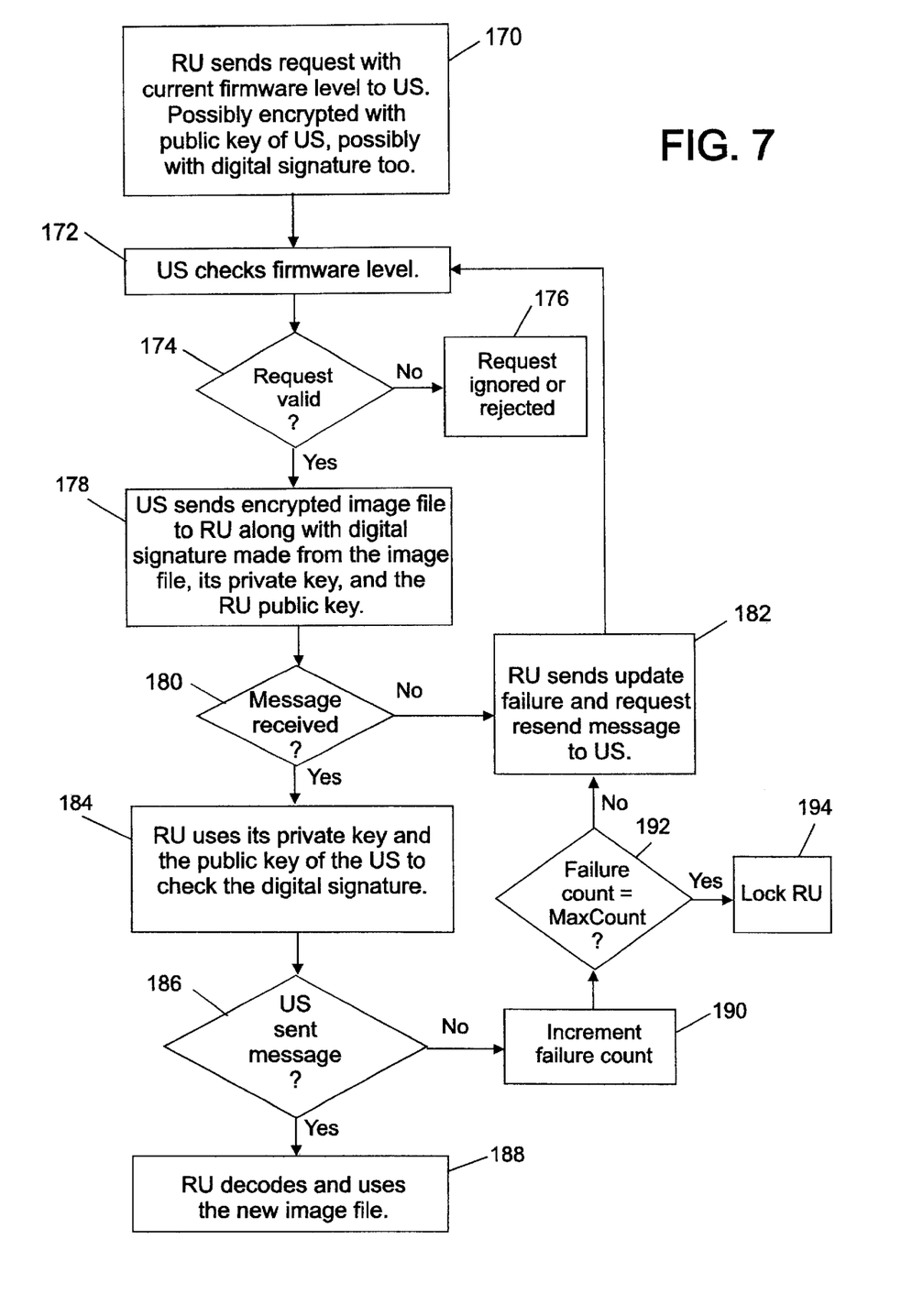

Yet another authentication/update process is illustrated in FIG. 7. The process of FIG. 7 is for the scenario when the update server 28 only has one software/firmware level to transmit to any of the remote units 22. Under such a scenario, the request message does not need to be encrypted. At step 170, the remote unit 22 transmits a request with current firmware levels to the update server 28. The request is encrypted with the public key of the update server 28 and possibly with a digital signature. At step 172, the update server 28 verifies the firmware level and the request. At step 174, the validity of the request is verified by the update server 28. If the request is not valid, and hence from a rogue remote unit, then at step 176 the request is ignored or rejected.

However, if the request is verified, then at step 178 the update server 28 transmits an encrypted image/update file to the remote unit 22 along with a digital signature generated from the update file program, its private key and the public key of the remote unit 22. At step 180, an inquiry is made as to whether the message has been received by the remote unit 22. If the message has not been received, then at step 182 the remote unit 22 transmits an update failure and requests that the message be re-sent by the update server 28. However, if the message has been received, then at step 184 the remote unit 22 utilizes its private key, and the public key of the update server 28 to verify the digital signature. At step 186, an inquiry is made to the source of the message. If the message has been sent by the update server 28, and this has been verified, then at step 188 the remote unit 22 decodes and loads the update file program. However, if the source of the message is not the update server 28, then at step 190 a failure count is generated by the remote unit 22. At step 192, an inquiry is made as to the number of failure counts and if the maximum failure count has been reached, then at step 194 the remote unit 22 locks itself to prevent further tampering by a rogue program. However, if the maximum failure count has not been reached, then at step 182 the remote unit 22 sends an update failure to the update server 28.

In an application where the remote unit 22 comprises a mobile unit, the desirable location to decrypt the firmware is in the mobile unit that will be storing the firmware. Otherwise, if the firmware is decrypted in attached laptop PC, or the like, and then transferred to the mobile unit over a serial link, then the security of the download process is vulnerable to substitution at the serial link. If the mobile unit is a cellular telephone, there is typically insufficient general purpose memory to accept an entire firmware update as a single transfer. Current cellular phones have about 1–2 Mbytes of program storage space to be updated, and 128 to 256 kbytes of general purpose memory, typically SRAM.

Thus, the firmware to be updated must be presented to the cellular phone in blocks of data. The simplest approach is to use a multiple of the block size of flash memory in the cellular phone, typically 32 or 64 kbytes. Subdivision of the update file could be done at the update server 28 or the flasher host PC 30.

The present invention provides a system and method to securely update a software program of a remote unit 22, such as a PC card 22*a* or a cellular telephone, over a network such as the Internet. The system and method of the present invention prevent rogue programs from being introduced into the remote unit 22 thereby countering cellular telephone fraud. The system and method also enable an authorized user of the remote unit 22 to update the software program of the remote unit 22 without having to physically transport the remote unit 22 to an authorized dealer.

We claim:

1. A system for updating software programs of remote units in a controlled secure manner over a network, the system comprising:

a remote programmable unit having a memory storing software programs, the remote programmable unit adapted for connection to the network;

an authentication server disposed remotely from the remote programmable unit and accessible over the network, the authentication server verifying the authenticity of the remote programmable unit and providing a decryption key to the remote programmable unit over the network for storage in the memory storing program of the remote programmable unit, wherein the decryption key is used to decode an encrypted update file program; and an update server disposed remotely from the remote programmable unit and accessible over the network, the update server providing the encrypted update file program to the remote programmable unit over the network for storage in the memory storing program of the remote programmable unit, wherein the remote programmable unit decrypts the encrypted update file program with the decryption key from the authentication server in order to update one of the software programs of the remote programmable unit.

2. The system according to claim 1 wherein the remote unit is a PC card.

3. The system according to claim 1 further comprising a flasher host to provide connection to the network for the remote programmable unit.

4. The system according to claim 3 wherein the remote programmable unit comprises means for communication over a cellular network.

5. The system according to claim 1 wherein the authentication server is integrated with the update server.

6. The system according to claim 1 wherein the network is the Internet.

7. The system according to claim 1 wherein the remote programmable unit comprises means for authenticating a communication from the authentication server.

8. The system according to claim 1 wherein the remote programmable unit is a cellular telephone.

9. A method for updating software programs for remote units over a network in a secure controlled manner, the method comprising:

transmitting a request for a software update from a remote unit to an authentication server over a network, the authentication server disposed remotely to the remote unit;

verifying the authenticity of a communication from the authentication server to the remote unit, the communication containing a decryption key to decode the update program for the software;

transmitting the software program update from an update server to the remote unit over the network, the update server disposed remotely to the remote unit;

decrypting the update program with the decryption key; and updating the software of the remote unit.

10. The method according to claim 9 wherein verifying the authenticity comprises communicating a first random number from the authentication server to the remote unit, communicating a second random number from the remote unit to the authentication server; and communicating a challenge response, based on the first and second random numbers, from the authentication server to the remote unit.

11. The method according to claim 9 wherein the remote unit is a PC card.

12. The method according to claim 9 wherein the network is the Internet.

13. The method according to claim 9 further comprising verifying the update program from the update server.

14. A system for updating software programs via a network, the system comprising:

a PC card having a memory storing software programs, the PC card adapted for connection to the network;

means for controlling the network connection to the PC card and for storing update file programs prior to utilization by the PC card;

means for providing an encrypted update file program to the PC card via the network to update a particular software program of the PC card; and means for decrypting the encrypted update file program, the decrypting means provided to, the PC card from a remote server via the network.

15. The system according to claim 14 wherein the communication transferring means is a flasher host which controls the update process by communicating over the network and transmitting commands to the PC card.

16. The system according to claim 14 wherein the decrypting means is an decrypted key encrypted in a verifiable message provided by an authentication server to the PC card via the network.

17. The system according to claim 14 wherein the transferring communication means is integrated into the PC card.

18. The system according to claim 14 wherein the network is the Internet.

* * * * *